United States Patent
Yoshida et al.

(10) Patent No.: US 8,937,609 B2
(45) Date of Patent: Jan. 20, 2015

(54) TOUCH SENSOR SYSTEM

(71) Applicant: Sharp Kabushiki Kaisha, Osaka-shi, Osaka (JP)

(72) Inventors: Shinichi Yoshida, Osaka (JP); Takahiro Morishita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 13/903,558

(22) Filed: May 28, 2013

(65) Prior Publication Data

US 2013/0321334 A1  Dec. 5, 2013

Related U.S. Application Data

(60) Provisional application No. 61/653,738, filed on May 31, 2012.

(30) Foreign Application Priority Data

May 30, 2012 (JP) .................................. 2012-122743

(51) Int. Cl.
G06F 3/045 (2006.01)
G06F 3/044 (2006.01)

(52) U.S. Cl.
CPC ...................................... *G06F 3/044* (2013.01)
USPC ........................................................ 345/174

(58) Field of Classification Search
None
See application file for complete search history.

(56) References Cited

U.S. PATENT DOCUMENTS

| | | | |
|---|---|---|---|
| 7,358,741 B2 * | 4/2008 | Sato et al. ..................... | 324/457 |
| 7,812,827 B2 | 10/2010 | Hotelling et al. | |
| 7,812,828 B2 | 10/2010 | Westerman et al. | |
| 8,085,243 B2 * | 12/2011 | Yamashita et al. ............ | 345/158 |
| 8,179,408 B2 * | 5/2012 | Chen et al. .................... | 347/174 |
| 8,259,086 B2 * | 9/2012 | Agari et al. ................... | 345/173 |
| 2011/0037727 A1 * | 2/2011 | Lee et al. ....................... | 345/174 |
| 2011/0084934 A1 | 4/2011 | Tsuzaki et al. | |

FOREIGN PATENT DOCUMENTS

| | | | |
|---|---|---|---|
| JP | 2010-244132 A | 10/2010 | |
| JP | 2011-86003 A | 4/2011 | |

* cited by examiner

*Primary Examiner* — Joseph Feild
*Assistant Examiner* — Parul Gupta
(74) *Attorney, Agent, or Firm* — Birch, Stewart, Kolasch & Birch, LLP (57) ABSTRACT

A detecting section of a touch sensor system detects a hand placing region in accordance with (i) a strength threshold for determining a strength of an electrostatic capacitance signal in a detection region so as to determine whether or not a touch input is carried out by a finger and (ii) a peripheral threshold which is lower than the strength threshold and is set so as to determine strengths of electrostatic capacitance signals in a plurality of peripheral regions surrounding the detection region.

4 Claims, 12 Drawing Sheets

TOUCH SENSOR SYSTEM

This nonprovisional application claims the benefit of U.S. Provisional Application No. 61/653,738 filed on May 31, 2012, and claims priority under 35 U.S.C.§119(a) on Patent Application No. 2012-122743 filed in Japan on May 30, 2012, the entire contents of all of which are hereby incorporated by reference.

TECHNICAL FIELD

The present invention relates to a touch sensor system for detecting a pen input and a finger input to a touch panel including a plurality of electrostatic capacitances provided in a matrix pattern.

BACKGROUND ART

Patent Literature 1 discloses a touch sensor system for detecting a distribution of values of a plurality of electrostatic capacitances formed at intersections of a plurality of first signal lines and a plurality of second signal lines. A conventional touch sensor system for detecting a distribution of electrostatic capacitance values attempts to recognize, by signal processing, a finger and hand part with which a touch panel is being touched (see Patent Literature 2).

Figure 12:
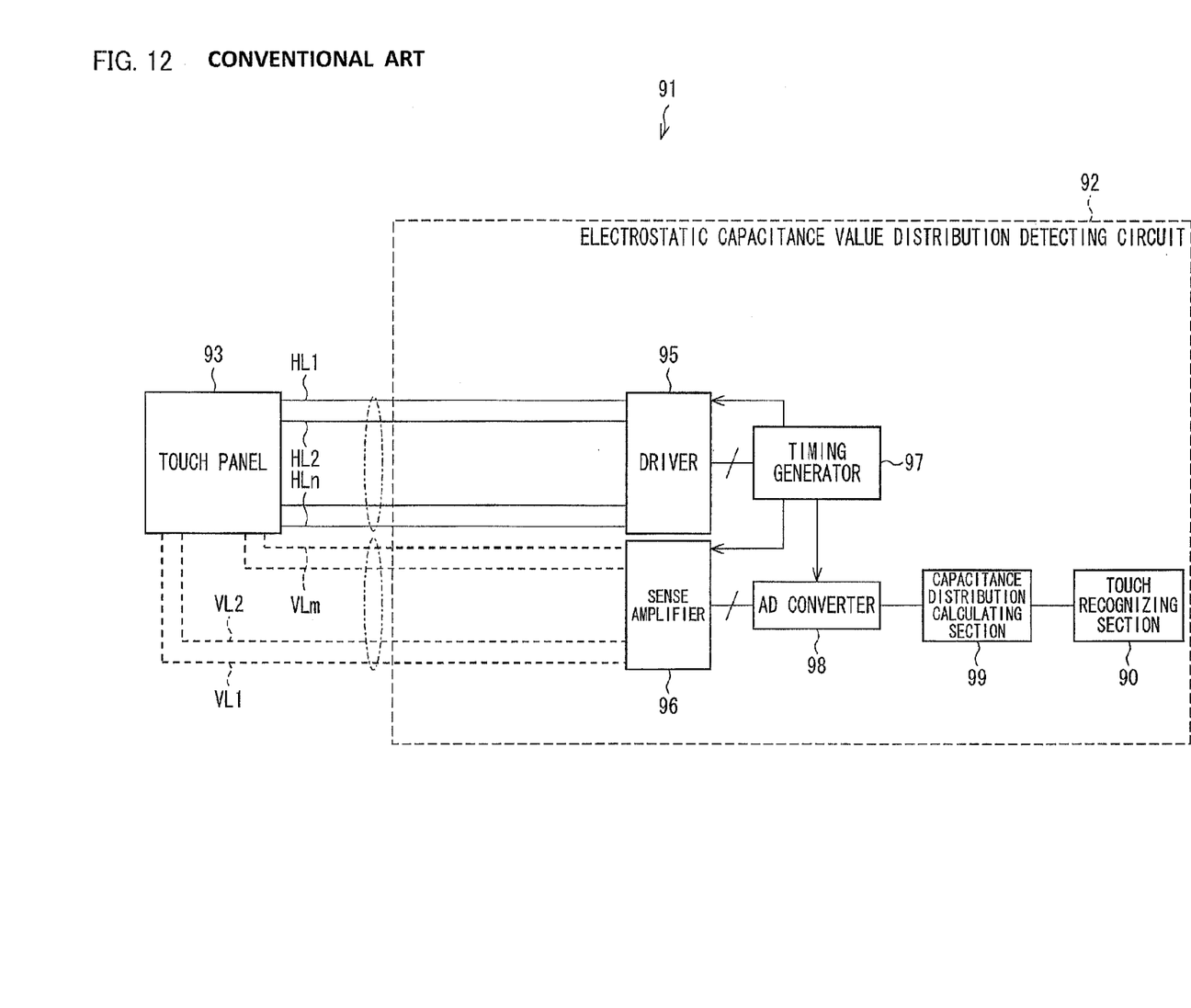
FIG. 12 is a block diagram illustrating a configuration of a conventional touch sensor system.

FIG. 12 is a block diagram illustrating a configuration of a conventional touch sensor system 91 disclosed in Patent Literature 3. The touch sensor system 91 includes a touch panel 93 and an electrostatic capacitance value distribution detecting circuit 92. The touch panel 93 includes drive lines HL1 through HLn arranged parallel to each other in a horizontal direction, sense lines VL1 through VLm arranged parallel to each other in a vertical direction, and a plurality of electrostatic capacitances formed at intersections of the drive lines HL1 through HLn and the sense lines VL1 through VLm.

The electrostatic capacitance value distribution detecting circuit 92 includes a driver 95. The driver 95 drives the plurality of electrostatic capacitances by a voltage application to the drive lines HL1 through HLn in accordance with a code sequence. The electrostatic capacitance value distribution detecting circuit 92 includes a sense amplifier 96. The sense amplifier 96 reads out, via the sense lines VL1 through VLm, a linear sum of voltages corresponding to the respective plurality of electrostatic capacitances driven by the driver 95, and then supplies the linear sum of voltages to an AD converter 98. The AD converter 98 subjects, to AD conversion, the linear sum of the voltages which has been read out via the sense lines VL1 through VLm, the voltages corresponding to the respective plurality of electrostatic capacitances, and then supplies, to a capacitance distribution calculating section 99, the linear sum of the voltages which has been subjected to the AD conversion.

The capacitance distribution calculating section 99 calculates an electrostatic capacitance distribution on the touch panel 93 in accordance with the code sequence and the linear sum of the voltages which has been supplied from the AD converter 98, the voltages corresponding to the respective plurality of electrostatic capacitances, and then supplies the electrostatic capacitance distribution thus calculated to a touch recognizing section 90. The touch recognizing section 90 recognizes, in accordance with the capacitance distribution thus supplied from the capacitance distribution calculating section 99, a location on the touch panel 93 at which location the touch panel 93 was touched.

The electrostatic capacitance value distribution detecting circuit 92 includes a timing generator 97. The timing generator 97 generates (i) a signal which specifies operation of the driver 95, (ii) a signal which specifies operation of the sense amplifier 96, and (iii) a signal which specifies operation of the AD converter 98, and then supplies the signals (i) through (iii) to the driver 95, the sense amplifier 96, and the AD converter 98, respectively.

Patent Literature 4 discloses an arrangement in which (i) a hand placing region indicative of a region in which a hand is placed so as to carry out a pen input with respect to a touch panel which includes a plurality of electrostatic capacitances provided in a matrix pattern is defined by application software that is installed in a host device connected to the touch sensor system, (ii) a frame defining the hand placing region is drawn, and (iii) a position of the hand placing region is corrected at any time following a movement of the hand placed so as to carry out the pen input with respect to the touch panel.

Patent Literature 5 discloses an arrangement in which (i) a hand placing region indicative of a region in which a hand is placed so as to carry out a pen input with respect to a touch panel which includes a plurality of electrostatic capacitances provided in a matrix pattern is detected in accordance with a strength of an electrostatic capacitance signal indicative of a change in electrostatic capacitance and (ii) a value of an electrostatic capacitance signal which value corresponds to an electrostatic capacitance provided in the hand placing region thus detected is replaced by a non-value indicative of a state in which no touch input is carried out.

CITATION LIST

Patent Literatures

Patent Literature 1
Specification of U.S. Pat. No. 7,812,827 (Publication Date: Oct. 12, 2010)
Patent Literature 2
Specification of U.S. Pat. No. 7,812,828 (Publication Date: Oct. 12, 2010)
Patent Literature 3
Japanese Patent Application, Tokugan, No. 2011-142164 A (Filing Date: Jun. 27, 2011)
Patent Literature 4
Japanese Patent Application, Tokugan, No. 2011-142163 A (Filing Date: Jun. 27, 2011)
Patent Literature 5
Japanese Patent Application, Tokugan, No. 2011-280581 A (Filing Date: Dec. 21, 2011)

SUMMARY OF INVENTION

Technical Problem

Each of Patent Literatures 4 and 5 of the above prior art documents discloses the hand placing region indicative of a region in which a hand is placed so as to carry out a pen input with respect to a touch panel. Patent Literature 4 teaches definition and drawing of the hand placing region, and correction of the position of the hand placing region. Patent Literature 5 discloses the arrangement in which the hand placing region is detected.

According to the arrangement disclosed in Patent Literature 5, an electrostatic capacitance signal in accordance with a touch input to the hand placing region can be removed by (i) determining, by use of a touch panel controller, that a region in which an electrostatic capacitance signal value is large is the hand placing region and (ii) excluding the region from a touch input detection target. However, since the determination is carried out only by a level of a signal value, a location of a touch input by a finger is also falsely recognized as the hand placing region and thus excluded from the touch input detection target. This makes it impossible to detect the touch input by a finger, so that a problem occurs such that the touch sensor system would be a pen-input-only input system.

An object of the present invention is to provide a touch sensor system which prevents a fear of falsely recognizing, as a hand placing region, a detection region in which an electrostatic capacitance signal in accordance with a finger input is generated.

Solution to Problem

In order to attain the foregoing object, a touch sensor system of the present invention includes: detecting means for detecting, in accordance with an electrostatic capacitance signal indicative of a change in electrostatic capacitance, a hand placing region indicative of a region in which a hand is placed so as to carry out a touch input with respect to a touch panel which includes a plurality of electrostatic capacitances provided in a matrix pattern; replacing means for replacing, by a non-value indicative of a state in which no touch input is carried out, a value of an electrostatic capacitance signal which value corresponds to an electrostatic capacitance provided in the hand placing region detected by the detecting means; and touch input recognizing means for supplying a coordinate value of the touch input to a host device in accordance with (i) the electrostatic capacitance signal whose value has been replaced by the non-value by the replacing means and (ii) an electrostatic capacitance signal corresponding to an electrostatic capacitance provided outside the hand placing region, the detecting means detecting the hand placing region in accordance with (i) a strength threshold for determining a strength of an electrostatic capacitance signal in a detection region so as to determine whether or not the touch input is carried out by a finger and (ii) a peripheral threshold which is lower than the strength threshold and is set so as to determine strengths of electrostatic capacitance signals in a plurality of peripheral regions surrounding the detection region.

Such features allow (i) a strength of an electrostatic capacitance signal in a detection region to be determined in accordance with a strength threshold for determining whether or not a touch input is carried out by a finger and (ii) strengths of electrostatic capacitance signals in a plurality of peripheral regions surrounding the detection region to be determined in accordance with a peripheral threshold which is lower than the strength threshold. Therefore, in a case where the detection region is detected in which the strength of the electrostatic capacitance signal exceeds the strength threshold for determining whether or not a touch input is carried out by a finger, a shape of an electrostatic capacitance distribution in an area around the detection region is checked, and it is determined that the electrostatic capacitance distribution in the area around the detection region is spread, it is determined that the detection region is a hand placing region, so that a value of an electrostatic capacitance signal which value corresponds to an electrostatic capacitance provided in the hand placing region can be replaced by a non-value indicative of a state in which no touch input is carried out. Accordingly, it is possible to provide the touch sensor system which prevents a fear of falsely recognizing, as a hand placing region, a detection region in which an electrostatic capacitance signal in accordance with a finger input is generated.

Advantageous Effects of Invention

The touch sensor system of the present invention detects the hand placing region in accordance with (i) a strength threshold for determining a strength of an electrostatic capacitance signal in a detection region so as to determine whether or not the touch input is carried out by a finger and (ii) a peripheral threshold which is lower than the strength threshold and is set so as to determine strengths of electrostatic capacitance signals in a plurality of peripheral regions surrounding the detection region.

Accordingly, it is possible to provide a touch sensor system which prevents a fear of falsely recognizing, as a hand placing region, a detection region in which an electrostatic capacitance signal in accordance with a finger input is generated.

BRIEF DESCRIPTION OF DRAWINGS

(a) of FIG. 7 illustrates a distribution of values of electrostatic capacitance signals on a touch panel provided in the touch sensor system. (b) of FIG. 7 is a three-dimensional graph of a distribution map of the electrostatic capacitance signals. (c) of FIG. 7 is a graph illustrating a relationship among the fourth row of the distribution (see (a) of FIG. 7) of the values of the electrostatic capacitance signals, a pen input threshold, and a peripheral threshold.

(a) of FIG. 8 illustrates another distribution of values of electrostatic capacitance signals on the touch panel. (b) of FIG. 8 is a three-dimensional graph of a distribution map of the electrostatic capacitance signals. (c) of FIG. 8 is a graph illustrating a relationship among the fourth of the distribution (see (a) of FIG. 8) of the values of the electrostatic capacitance signals, a pen input threshold, and a peripheral threshold.

(a) of FIG. 9 illustrates still another distribution of values of electrostatic capacitance signals on the touch panel. (b) of FIG. 9 is a three-dimensional graph of a distribution map of the electrostatic capacitance signals. (c) of FIG. 9 is a graph illustrating a relationship among the fourth row of the distribution (see (a) of FIG. 9) of the values of the electrostatic capacitance signals, a pen input threshold, and a peripheral threshold.

(a) of FIG. 10 illustrates still another distribution of values of electrostatic capacitance signals on the touch panel. (b) of FIG. 10 is a three-dimensional graph of a distribution map of the electrostatic capacitance signals. (c) of FIG. 10 is a graph illustrating a relationship among the fourth row of the distribution (see (a) of FIG. 10) of the values of the electrostatic capacitance signals, a strength threshold, and a peripheral threshold.

(a) of FIG. 11 illustrates still another distribution of values of electrostatic capacitance signals on the touch panel. (b) of FIG. 11 is a three-dimensional graph of a distribution map of the electrostatic capacitance signals. (c) of FIG. 11 is a graph illustrating a relationship among the seventh row of the distribution (see (a) of FIG. 11) of the values of the electrostatic capacitance signals, a strength threshold, and a peripheral threshold.

DESCRIPTION OF EMBODIMENTS

The following description specifically discusses a touch sensor system in accordance with an embodiment of the present invention.

(Configuration of Touch Sensor System 1)

Figure 1:
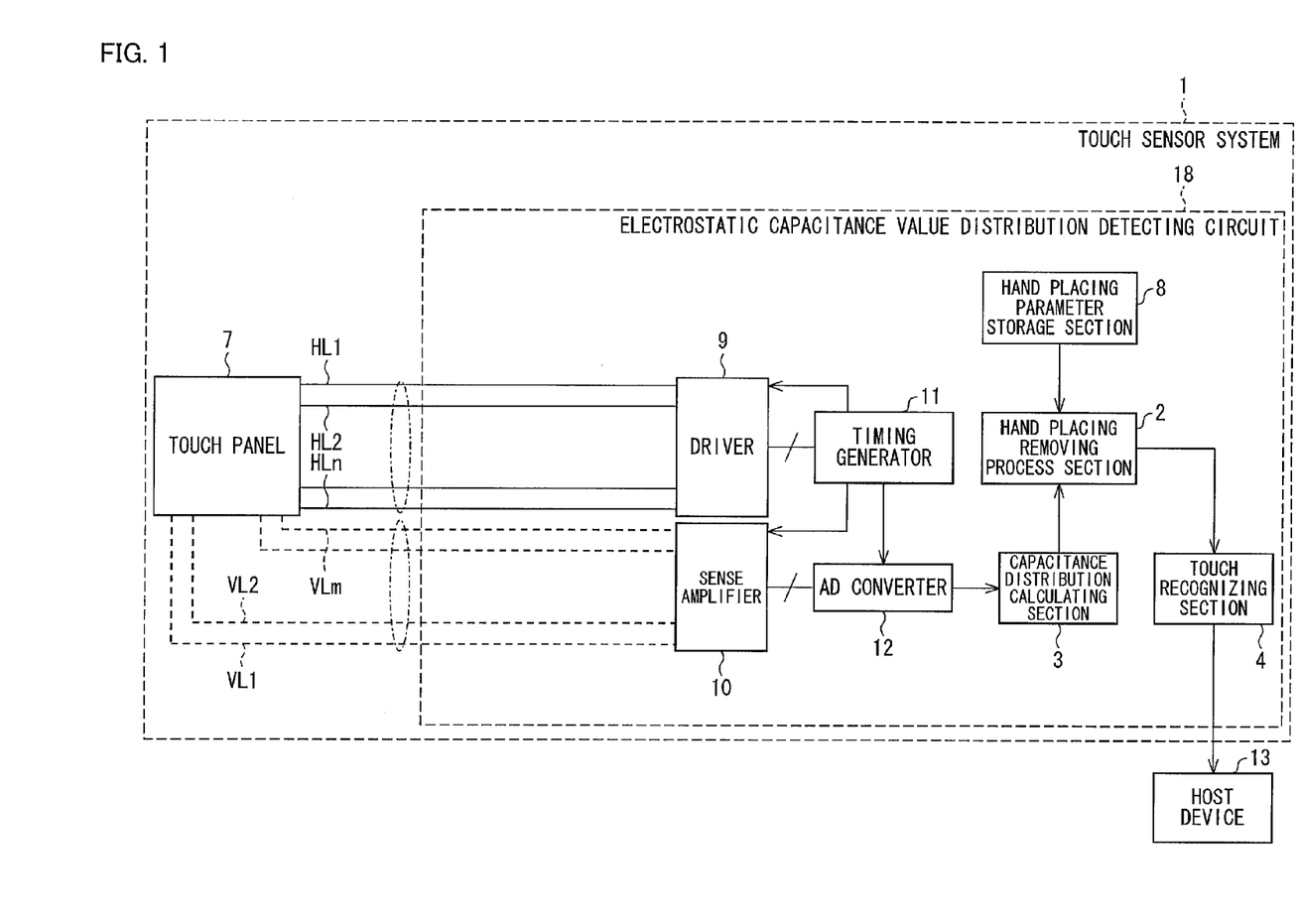
FIG. 1 is a block diagram illustrating a configuration of a touch sensor system in accordance with an embodiment.

FIG. 1 is a block diagram illustrating a configuration of a touch sensor system 1 in accordance with Embodiment 1. The touch sensor system 1 includes a touch panel 7 and an electrostatic capacitance value distribution detecting circuit 18. The touch panel 7 includes drive lines HL1 through HLn arranged parallel to each other in a horizontal direction, sense lines VL1 through VLm arranged parallel to each other in a vertical direction, and a plurality of electrostatic capacitances formed at intersections of the drive lines HL1 through HLn and the sense lines VL1 through VLm.

The electrostatic capacitance value distribution detecting circuit 18 includes a driver 9. The driver 9 drives the plurality of electrostatic capacitances by a voltage application to the drive lines HL1 through HLn in accordance with a code sequence. The electrostatic capacitance value distribution detecting circuit 18 includes a sense amplifier 10. The sense amplifier 10 reads out, via the sense lines VL1 through VLm, a linear sum of voltages corresponding to the respective plurality of electrostatic capacitances driven by the driver 9, and then supplies the linear sum of voltages to an AD converter 12. The AD converter 12 subjects, to AD conversion, the linear sum of the voltages which has been read out via the sense lines VL1 through VLm, the voltages corresponding to the respective plurality of electrostatic capacitances, and then supplies, to a capacitance distribution calculating section 3, the linear sum of the voltages which has been subjected to the AD conversion.

The capacitance distribution calculating section 3 calculates an electrostatic capacitance distribution on the touch panel 7 in accordance with the code sequence and the linear sum of the voltages which has been supplied from the AD converter 12, the voltages corresponding to the respective plurality of electrostatic capacitances, and then supplies the electrostatic capacitance distribution thus calculated to a hand placing removing process section 2.

Figure 2:
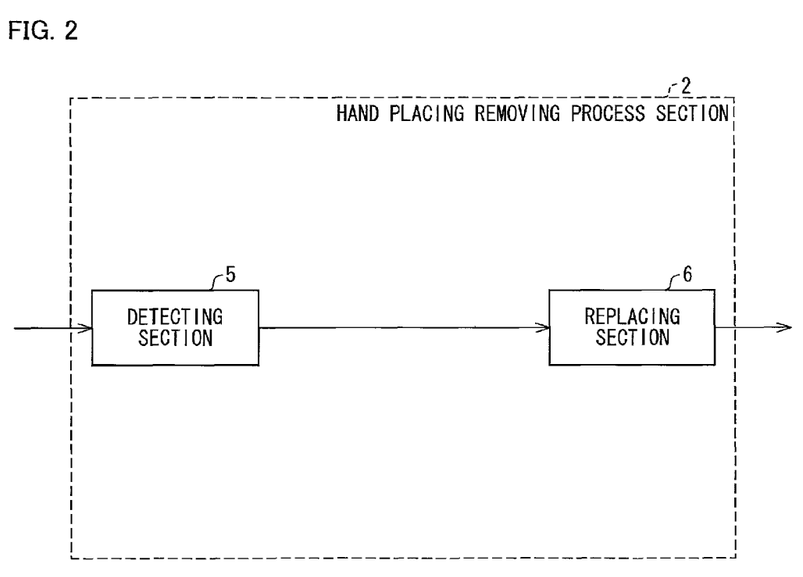
FIG. 2 is a block diagram illustrating a configuration of a hand placing removing process section provided in the touch sensor system.

FIG. 2 is a block diagram illustrating a configuration of the hand placing removing process section 2 provided in the touch sensor system 1. The hand placing removing process section 2 includes a detecting section 5 and a replacing section 6. The detecting section 5 detects, in accordance with (i) an electrostatic capacitance signal indicative of a change in electrostatic capacitance and (ii) a parameter stored in a hand placing parameter storage section 8, a hand placing region indicative of a region in which a hand is placed so as to carry out a pen input or a finger input with respect to the touch panel 7 which includes the plurality of electrostatic capacitances provided in a matrix pattern.

The detecting section 5 detects the hand placing region in accordance with (i) a strength threshold for determining a strength of an electrostatic capacitance signal in a detection region so as to determine whether or not a touch input is carried out by a finger and (ii) a peripheral threshold which is lower than the strength threshold and is set so as to determine strengths of electrostatic capacitance signals in a plurality of peripheral regions surrounding the detection region.

In a case where (i) the strength of the electrostatic capacitance signal in the detection region exceeds the strength threshold and (ii) the number of peripheral regions in each of which a strength of an electrostatic capacitance signal exceeds the peripheral threshold exceeds a predetermined area threshold, the detecting section 6 determines that the detection region is the hand placing region.

The detecting section 5 can detect the hand placing region in accordance with (i) a pen input threshold for determining whether or not the touch input is carried out by a pen and (ii) the peripheral threshold.

The replacing section 6 replaces, by a non-value indicative of a state in which no touch input is carried out, a value of an electrostatic capacitance signal which value corresponds to an electrostatic capacitance provided in the hand placing region thus detected by the detecting section 5, and then supplies the electrostatic capacitance signal to a touch recognizing section 4 (see FIG. 1).

In accordance with (i) the electrostatic capacitance signal whose value has been replaced by the non-value by the replacing section 6 and (ii) an electrostatic capacitance signal corresponding to an electrostatic capacitance provided outside the hand placing region, the touch recognizing section 4 supplies, to a host device 13 connected to an outside of the touch sensor system 1, a coordinate value of the touch input by a pen or a finger. The host device 13 carries out a process by use of application software in accordance with the coordinate value of the touch input which coordinate value has been supplied from the touch recognizing section 4.

The electrostatic capacitance value distribution detecting circuit 18 includes a timing generator 11. The timing generator 11 generates (i) a signal which specifies operation of the driver 9, (ii) a signal which specifies operation of the sense amplifier 10, and (iii) a signal which specifies operation of the AD converter 12, and then supplies the signals (i) through (iii) to the driver 9, the sense amplifier 10, and the AD converter 12, respectively.

Figure 3:
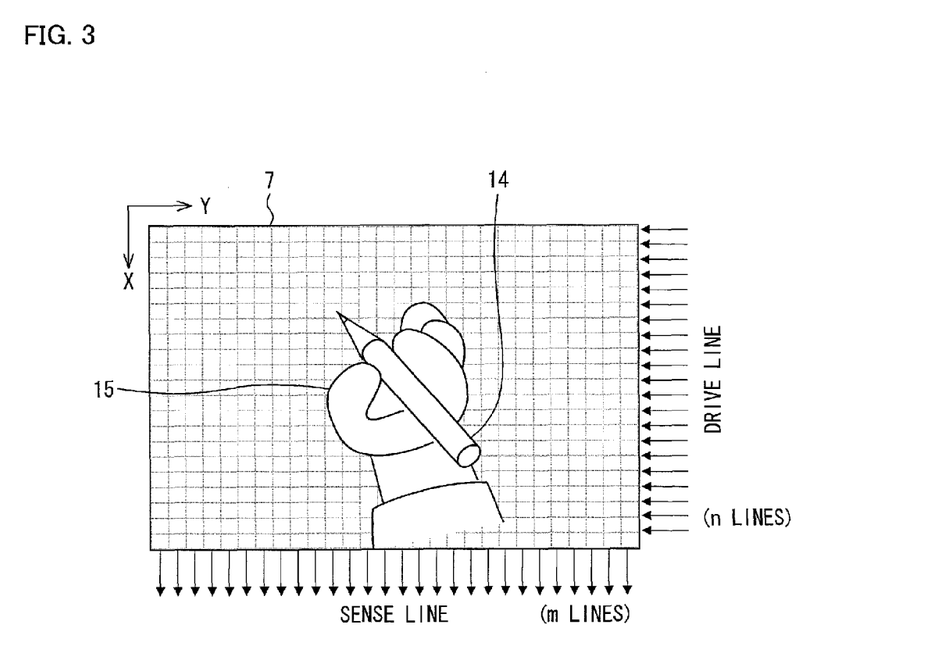
FIG. 3 illustrates a method for detecting a hand placing region in accordance with the touch sensor system.

FIG. 3 illustrates a method in accordance with the touch sensor system 1 for detecting a hand placing region. FIG. 3 schematically illustrates how handwriting with a pen 14 is carried out while a hand 15 is being placed on a touch panel 7 which includes n drive lines and m sense lines.

(Operation of Touch Sensor System)

Figure 4:
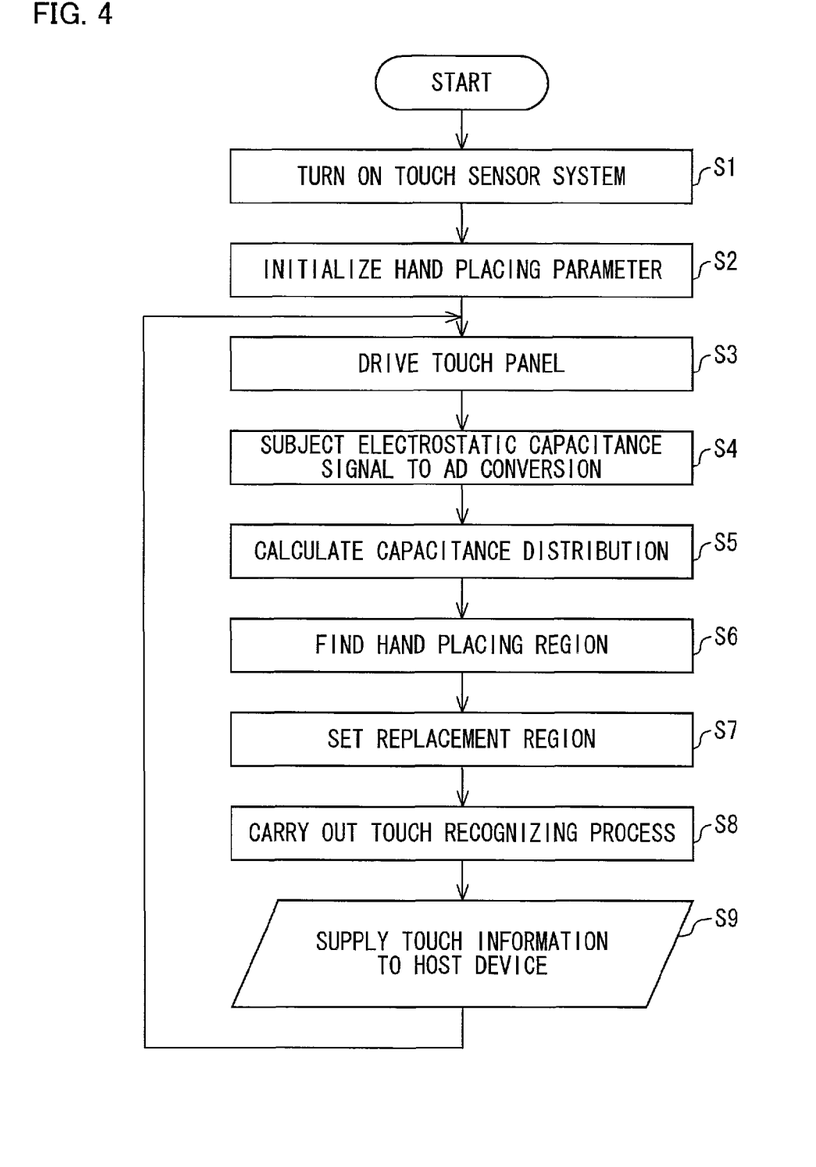
FIG. 4 is a flowchart illustrating operation of the touch sensor system.

FIG. 4 is a flowchart illustrating operation of the touch sensor system 1 in accordance with the embodiment. First, the touch panel system 1 shown in FIG. 1 is turned on (step 1). Then, the parameter stored in the hand placing parameter storage section 8 provided in the capacitance distribution detecting circuit 18 of the touch panel system 1 is initialized (step S2). Next, the touch panel 7 is driven by the driver 9 (step S3). Subsequently, an electrostatic capacitance signal read out from the touch panel 7 by the sense amplifier 10 is subjected to AD conversion by the AD converter 12 (step S4).

The capacitance distribution calculating section 3 calculates a capacitance distribution on the touch panel 7 in accordance with the electrostatic capacitance signal subjected to AD conversion by the AD converter 12 (step S5). Next, the hand placing removing process section 2 calculates the hand placing region in accordance with the capacitance distribution on the touch panel 7 which capacitance distribution has been calculated by the capacitance distribution calculating section 3 (step S6). Thereafter, the hand placing removing process section 2 sets a replacement region in accordance with the hand placing region thus calculated, and replaces a capacitance value in the replacement region by zero (step S7).

Subsequently, the touch recognizing section 4 finds a coordinate value of a touch input in accordance with the capacitance distribution on the touch panel 7 in which capacitance distribution the capacitance value in the replacement region has been replaced by zero (step S8). Next, the touch recognizing section 4 supplies the coordinate value of the touch input to the host device 13 (step S9). Then, the operation returns to step S3.

(Detection Operation of Hand Placing Region)

Figure 5:
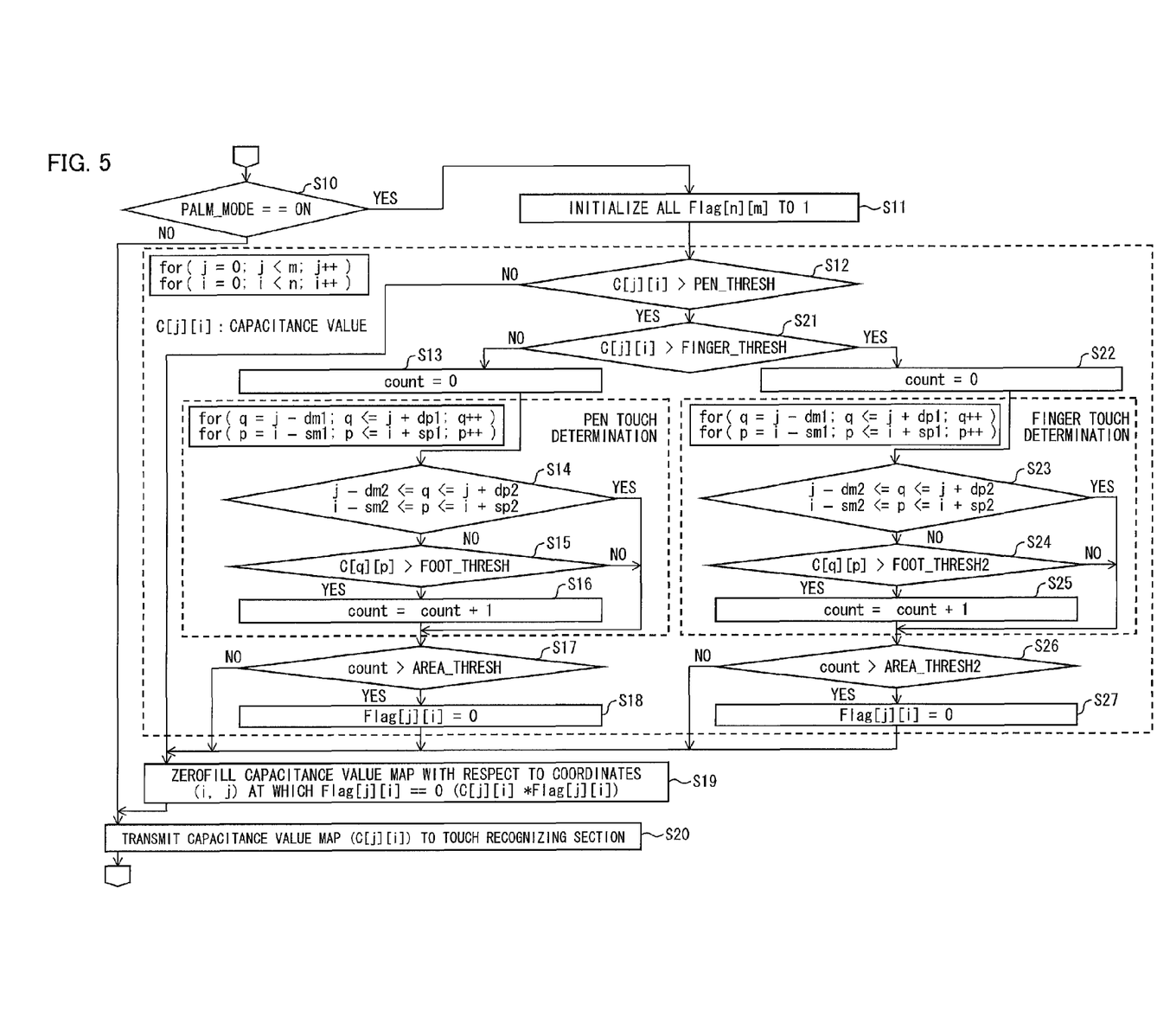
FIG. 5 is a flowchart illustrating operation of the hand placing removing process section provided in the touch sensor system.

FIG. 5 is a flowchart illustrating operation of the hand placing removing process section 2. This flowchart corresponds to a detailed flowchart of steps S6 and S7 illustrated in FIG. 4.

First, the following are meanings of parameters for use in a description of the flowchart.

m: the number of sense lines,
n: the number of drive lines,
PALM_MODE: a hand placing pen mode flag, 1 when PALM_MODE is ON, and 0 when PALM_MODE is OFF,
PEN_THRESH: a pen input threshold for determining whether or not a touch input is carried out by a pen,
FOOT_THRESH: a peripheral threshold for determining a level of an electrostatic capacitance signal value in a vicinity of a peak of a capacitance distribution map,
AREA_THRESH: an area threshold for determining the number of peripheral regions in each of which the electrostatic capacitance signal value exceeds the peripheral threshold FOOT_THRESH in the vicinity of the peak of the capacitance distribution map,
C[j][i]: a capacitance value (a strength of an electrostatic capacitance signal) at coordinates (i, j),
Flag[j][i]: a flag for replacing a value of the electrostatic capacitance signal in the capacitance distribution map by zero (hereinafter, also referred to as "zero filling"), zero filling is carried out when Flag[j][i]=0, and zero filling is not carried out for when Flag[j][i]=1,
count: a counter for counting the number of peripheral regions in each of which a capacitance value C[q][p] at coordinates (p, q) exceeds the peripheral threshold FOOT_THRESH,
FINGER_THRESH: a strength threshold for determining whether or not the touch input is carried out by a finger,
FOOT_THRESH2: a second peripheral threshold for determining a signal value in the vicinity of the peak of the capacitance distribution map, and
AREA_THRESH2: a second area threshold for determining the number of peripheral regions in each of which the signal value exceeds the second peripheral threshold FOOT_THRESH2 in the vicinity of the peak of the capacitance distribution map.

According to the flowchart shown in FIG. 5, an electrostatic capacitance signal in accordance with a touch input to the hand placing region is removed by recognizing, by discrimination, a pen touch and a finger touch. A process for determining the pen touch is carried out at steps S14 through S16, and a process for determining the finger touch is carried out at steps S23 through S25.

First, in a case where it is determined at step S10 that a parameter PALM_MODE is ON (YES at step S10), at step 11, the detecting section 5 provided in the hand placing removing process section 2 initializes, to 1, the flag Flag[j][i] stored in the hand placing parameter storage section 8. Further, it is determined at step S12 whether or not the capacitance value C[j][i] of the touch panel 7 is greater than the pen input threshold PEN_THRESH. In a case where it is determined that the capacitance value C[j][i] is greater than the pen input threshold PEN_THRESH (YES at step S12), it is determined at step S21 whether or not the capacitance value C[j][i] of the touch panel 7 is greater than the strength threshold FINGER_THRESH.

In a case where it is determined that the capacitance value C[j][i] is not greater than the strength threshold FINGER_THRESH (NO at step S21), a counter count is initialized to 0 (step S13).

Subsequently, the process carried out at steps S14 through S16 is repeated for coordinates (p, q) which satisfy the following formulas:

$$j-dm1 \leq q \leq j+dp1$$

$$i-sm1 \leq p \leq i+sp1$$

In a case where it is determined at step S14 that coordinates (p, q) satisfy the following formulas:

$$j-dm2 \leq q \leq j+dp2$$

$$i-sm2 \leq p \leq i+sp2$$

(YES at step S14), the process carried out at steps S14 through S16 is repeated with respect to subsequent coordinates (p, q).

In a case where it is determined at step S14 that coordinates (p, q) do not satisfy the following formulas:

$$j-dm2 \leq q \leq j+dp2$$

$$i-sm2 \leq p \leq i+sp2$$

(NO at step S14), it is determined at step S15 whether or not the capacitance value C[q][p] of the touch panel 7 is greater than the peripheral threshold FOOT_THRESH. In a case where it is determined that the capacitance value C[q][p] is greater than the peripheral threshold FOOT_THRESH (YES at step S15), a value of the counter count is increased only by 1 at step S16. In a case where it is determined that the capacitance value C[q][p] is not greater than the peripheral threshold FOOT_THRESH (NO at step S15), the process carried out at steps S14 through S16 is repeated with respect to subsequent coordinates (p, q).

For steps S14 through S16, when the repeat of the process with respect to the coordinates (p, q) which satisfy the following formulas:

$$j-dm1 \leq q \leq j+dp1$$

$$i-sm1 \leq p \leq i+sp1$$

is finished, it is determined at step S17 whether or not the counter count is greater than the area threshold AREA_THRESH. In a case where it is determined that the counter count is greater than the area threshold AREA_THRESH (YES at step S17), the flag Flag[j][i] is set to 0 at step S18.

In a case where it is determined that the capacitance value C[j][i] is greater than the strength threshold FINGER_THRESH (YES at step S21), the counter count is initialized to 0 (step S22). Subsequently, the process carried out at steps S23 through S25 is repeated for coordinates (p, q) which satisfy the following formulas:

$$j-dm1 \leq q \leq j+dp1$$

$$i-sm1 \leq p \leq i+sp1$$

In a case where it is determined at step S23 that coordinates (p, q) satisfy the following formulas:

$$j-dm2 \leq q \leq j+dp2$$

$$i-sm2 \leq p \leq i+sp2$$

(YES at step S23), the process carried out at steps S23 through S25 is repeated with respect to subsequent coordinates (p, q). In a case where it is determined at step S23 that coordinates (p, q) do not satisfy the following formulas:

$$j-dm2 \le q \le j+dp2$$

$$i-sm2 \le p \le i+sp2$$

(NO at step S23), it is determined at step 24 whether or not the capacitance value C[q][p] of the touch panel 7 is greater than the second peripheral threshold FOOT_THRESH2. In a case where it is determined that the capacitance value C[q][p] is greater than the second peripheral threshold FOOT_THRESH2 (YES at step S24), the value of the counter count is increased only by 1 at step S25. In a case where it is determined that the capacitance value C[q][p] is not greater than the second peripheral threshold FOOT_THRESH2 (NO at step S24), the process carried out at steps S23 through S25 is repeated with respect to subsequent coordinates (p, q).

For steps S23 through S25, when the repeat of the process with respect to the coordinates (p, q) which satisfy the following formulas:

$$j-dm1 \le q \le j+dp1$$

$$i-sm1 \le p \le i+sp1$$

is finished, it is determined at step S26 whether or not the counter count is greater than the second area threshold AREA_THRESH2. In a case where it is determined that the counter count is greater than the second area threshold AREA_THRESH2 (YES at step S26), the flag Flag[j][i] is set to 0 at step S27.

The process carried out at the steps S12 through S27 (except steps S19 and S29) is repeated as many times as corresponding to respective Cs [j][i] of the capacitance distribution map with n rows and m columns. After the repeat is finished, the replacing section 6 replaces the capacitance value C[j][i] by zero with respect to coordinates at which the flag Flag[j][i] is zero (step S19).

For setting of the replacement region for the touch recognizing section 4, the electrostatic capacitance value obtained in the hand placing region does not need to be replaced by zero but the setting can be carried out by any method provided that the hand placing region can be set to a non-detection region of a touch recognition. It is only necessary that the electrostatic capacitance value obtained in the hand placing region be replaced by a non-value indicative of a state in which no touch input is carried out.

In a case where it is determined that the parameter PALM_MODE is not ON (No at step S10) or step S19 is carried out, the hand placing removing process section 2 transmits, to the touch recognizing section 4, the replaced capacitance value C[j][i] subjected to the replacement (step S20).

The parameter PALM_MODE is a flag indicating whether a hand placing mode is ON or OFF and is stored in the hand placing parameter storage section 8. In a case where PALM_MODE is ON, a hand placing response process shown in steps S11 through S27 is carried out.

Further, for setting of the replacement region for the touch recognizing section 4, the electrostatic capacitance value obtained in the hand placing region does not need to be replaced by zero but the setting can be carried out by any method provided that the hand placing region can be set to a non-detection region of a touch recognition. It is only necessary that the electrostatic capacitance value obtained in the hand placing region be replaced by a non-value indicative of a state in which no touch input is carried out.

(Relationship among Detection Region R1, Peripheral Region R2, and Intermediate Region R3)

Figure 6:
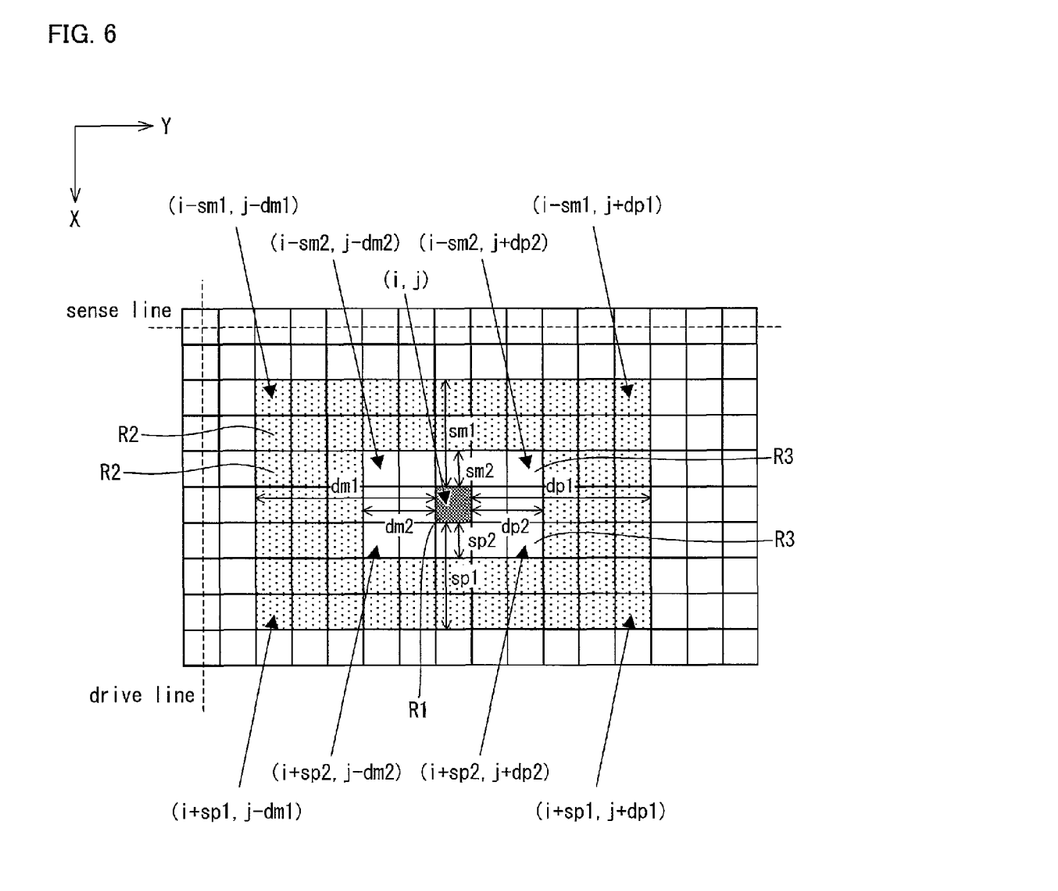
FIG. 6 illustrates a relationship among parameters described in the flowchart which illustrates the operation of the hand placing removing process section.

In order to make it easy to understand an algorithm shown in FIG. 5, FIG. 6 illustrates a relationship between the coordinates (i, j) and the parameters described in the process carried out at steps S14 through S16 and S23 through S25.

A detection region R1 which determines a strength of an electrostatic capacitance signal so as to determine whether or not the touch input is carried out by a finger has coordinates (i, j) and is surrounded by a plurality of peripheral regions R2 having a doughnut-shape. Intermediate regions R3 are provided between the detection region R1 and the plurality of peripheral regions R2.

As described earlier, the coordinates of the detection region R1 are (i, j) and coordinates of a peripheral region R2 on an upper left are (i−sm1, j−dm1). Coordinates of a peripheral region R2 on a lower left are (i+sp1, j−dm1), coordinates of a peripheral region R2 on an upper right are (i−sm1, j+dp1), and coordinates of a peripheral region R2 on a lower right are (i+sp1, j+dp1).

Coordinates of an intermediate region R3 on the upper left are (i−sm2, j−dm2), coordinates of an intermediate region R3 on the lower left are (i+sp2, j−dm2). Coordinates of an intermediate region R3 on the upper right are (i−sm2, j+dp2) and coordinates of an intermediate region R3 on the lower right are (i+sp2, j+dp2).

(Determination of Touch Input by Pen)

Figure 7:
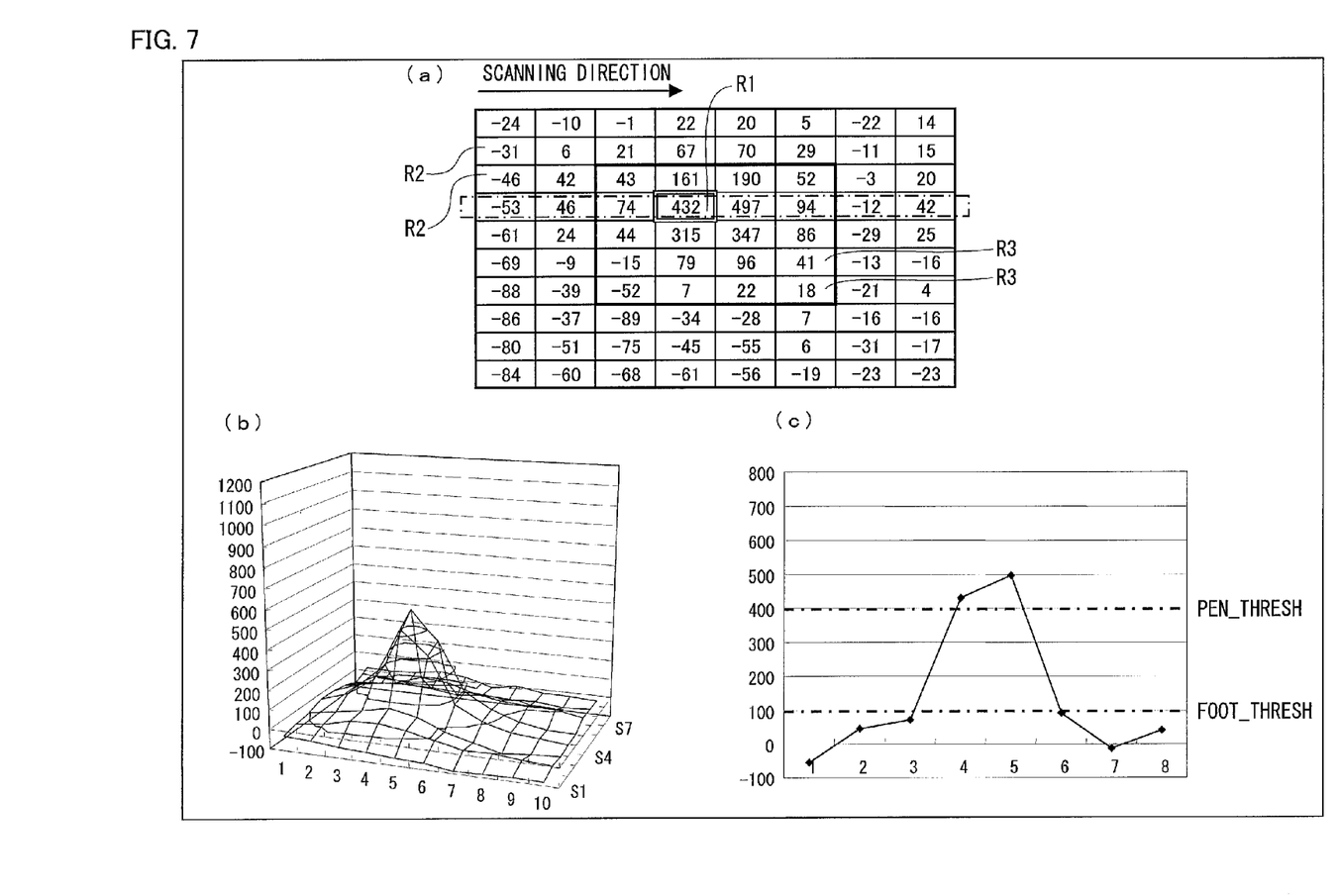

(a) of FIG. 7 is an example in which a part of a capacitance distribution map (an area around a pen touch position) is actually measured in a case where a touch panel is touched with a pen. This capacitance distribution map is generated by the capacitance distribution calculating section 3 shown in FIG. 1. The pen touch position is detected by carrying out sequential rightward scanning with respect to the capacitance distribution map from an upper left of the capacitance distribution map. A position at which the capacitance value exceeds the pen input threshold PEN_THRESH=400 is the detection region R1 indicated by "432" at an intersection of the fourth row and the fourth column. An arrangement of the detection region R1, the peripheral regions R2, and the intermediate regions R3 which arrangement is shown in (a) of FIG. 7 corresponds to an arrangement in which the parameters shown in FIG. 6 are set as below assuming that coordinates of the detection region R1 are (i, j).

sm1=3,
Sp1=6,
dm1=3,
dp1=4,
sm2=1,
sp2=3,
dm2=1,
dp2=2, (b) of FIG. 7 is a three-dimensional graph of the capacitance distribution map shown in (a) of FIG. 7. (c) of FIG. 7 graphs the fourth row of the capacitance distribution map of (a) of FIG. 7. A region (a plurality of peripheral regions R2) located outside a rectangular region with 5 rows and 4 columns which rectangular region is enclosed with a thick line and includes the detection region R1 and the intermediate regions R3 (see (a) of FIG. 7) serves as a region in which it is determined whether an electrostatic capacitance signal value is greater than the peripheral threshold FOOT_THRESH. For example, in a case where the peripheral threshold is set to FOOT_THRESH=100, there is no peripheral region R2 having coordinates at which an electrostatic capacitance signal value exceeds the peripheral threshold FOOT_THRESH (see (a) of FIG. 7). This causes the counter count to be 0. Therefore, for example, in a case where the area threshold is set to AREA_THRESH=3, count>AREA_THRESH is not satisfied. Thus, the flag Flag[j][i] remains 1 and does not change. Therefore, it is determined that the touch input is carried out by a pen at the coordinates (i, j), so that C[j][i] is not zero-filled.

Figure 8:
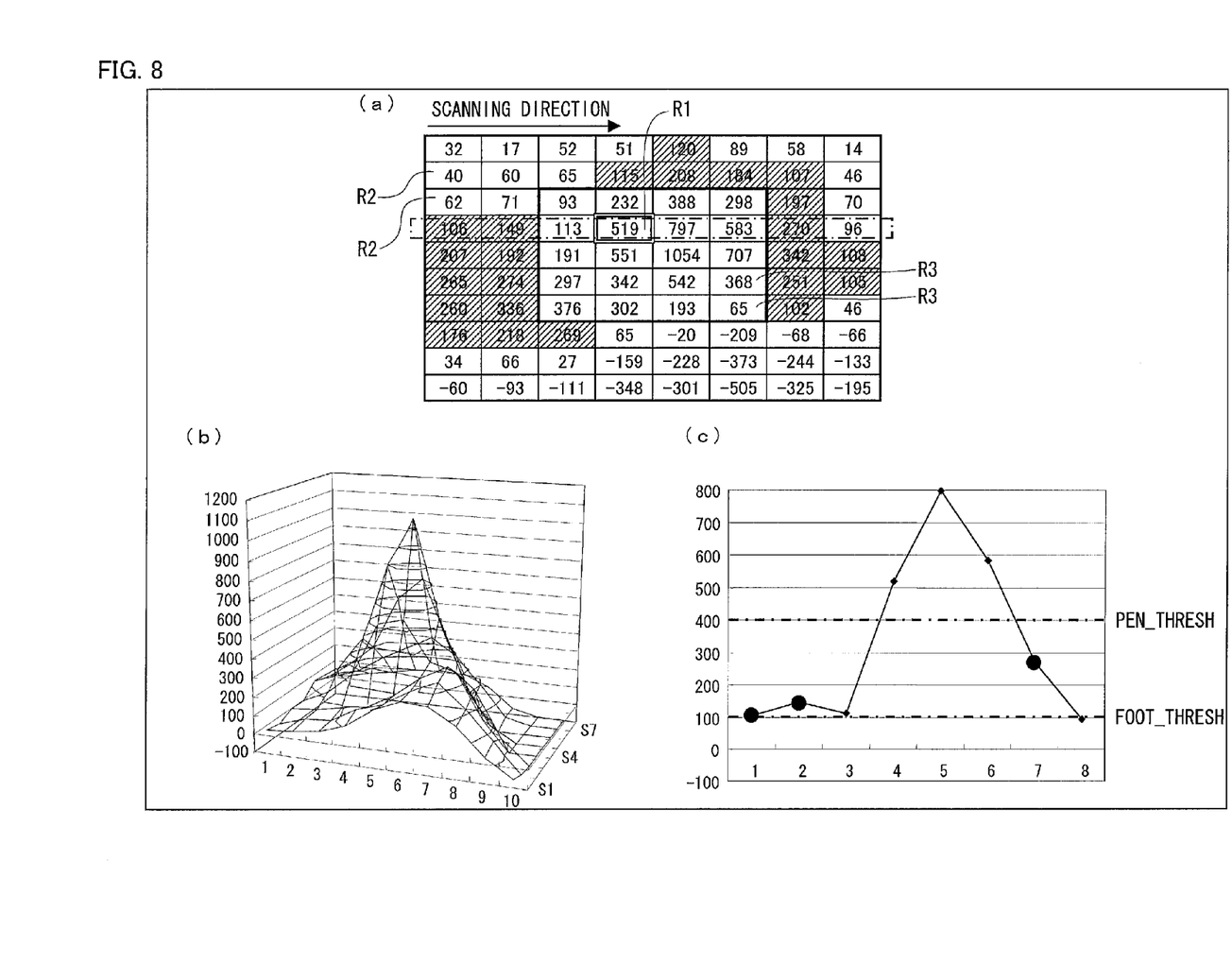

Similarly, (a), (b), and (c) of FIG. 8 are a capacitance distribution map obtained at the moment at which a fist is brought into contact with the touch panel 7, and graphs of the capacitance distribution map. In a case where parameters are set to values identical to those set as the parameters in the case of the pen input shown in FIG. 7, a plurality of peripheral regions R2 located outside a rectangular region with 5 rows and 4 columns which rectangular region is enclosed with a thick line (see (a) of FIG. 8) serve as a region in which it is determined whether an electrostatic capacitance signal value is greater than the peripheral threshold FOOT_THRESH. There are 23 peripheral regions R2 each of which has an electrostatic capacitance signal value exceeding the peripheral threshold FOOT_THRESH=100 (see shaded parts in (a) of FIG. 8). This causes the counter count to be 23. In this case, if the area threshold is set to AREA_THRESH=3, count>AREA_THRESH is satisfied. Thus, the flag Flag[j][i] is changed to 0. Therefore, it is determined that the detection region R1 at the coordinates (i, j) is not a region in which the touch input is carried out by a pen but a hand placing region, so that C[j][i] is zerofilled. The detection region R1 is a place in which the capacitance value exceeds the pen input threshold PEN_THRESH=400 during the scanning.

Figure 9:
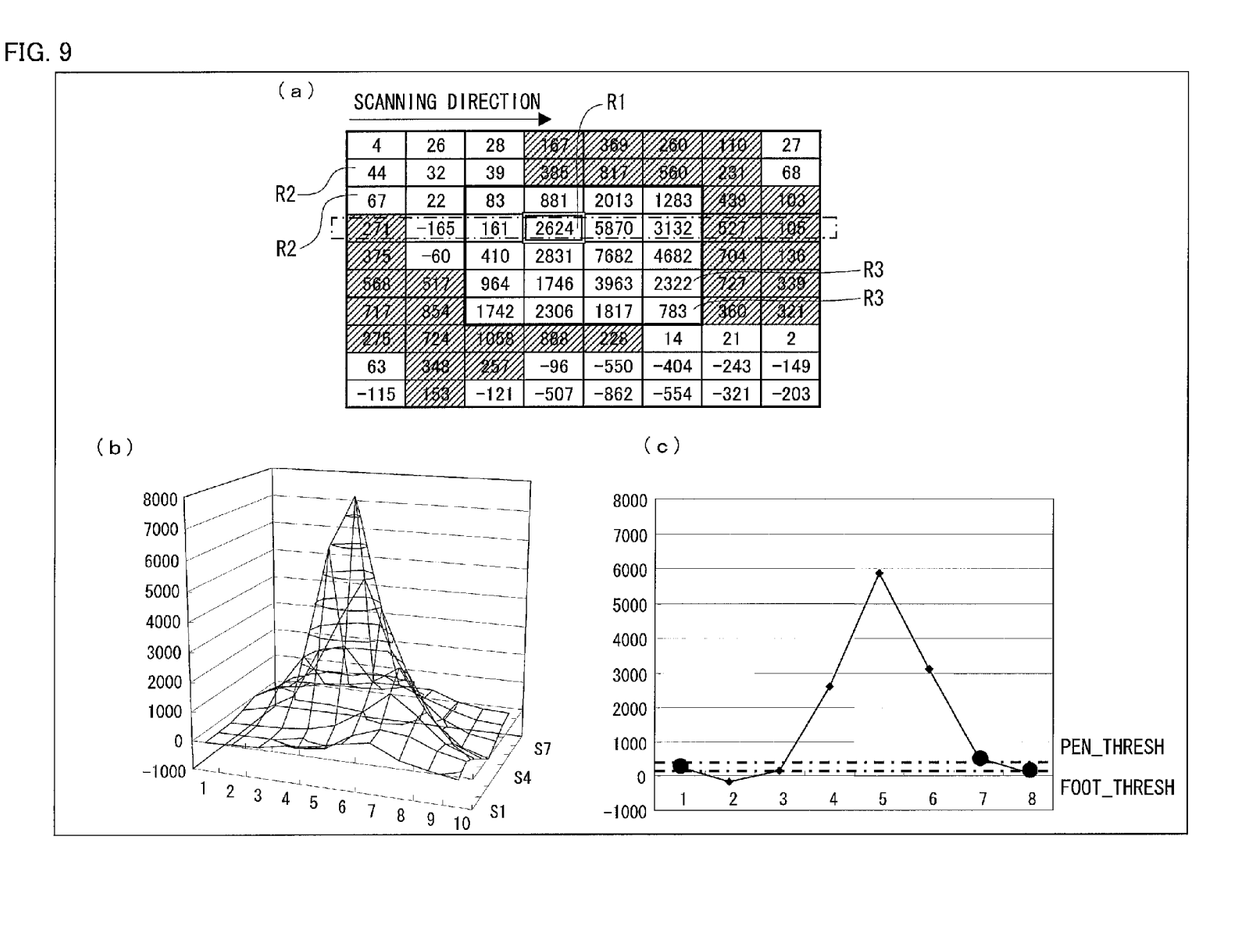

(a), (b), and (c) of FIG. 9 are a capacitance distribution map obtained in a state in which a fist is in contact with the touch panel, and graphs of the capacitance distribution map. The detection region R1 is a place in which the capacitance value exceeds the pen input threshold PEN_THRESH=400 during the scanning. Also in this case, as in the case of the example shown in FIG. 8, it is determined that the detection region R1 at the coordinates (i, j) is not a region in which the touch input is carried out by a pen but a hand placing region, so that C[j][i] is zerofilled.

(Determination of Touch Input by Finger)

Figure 10:
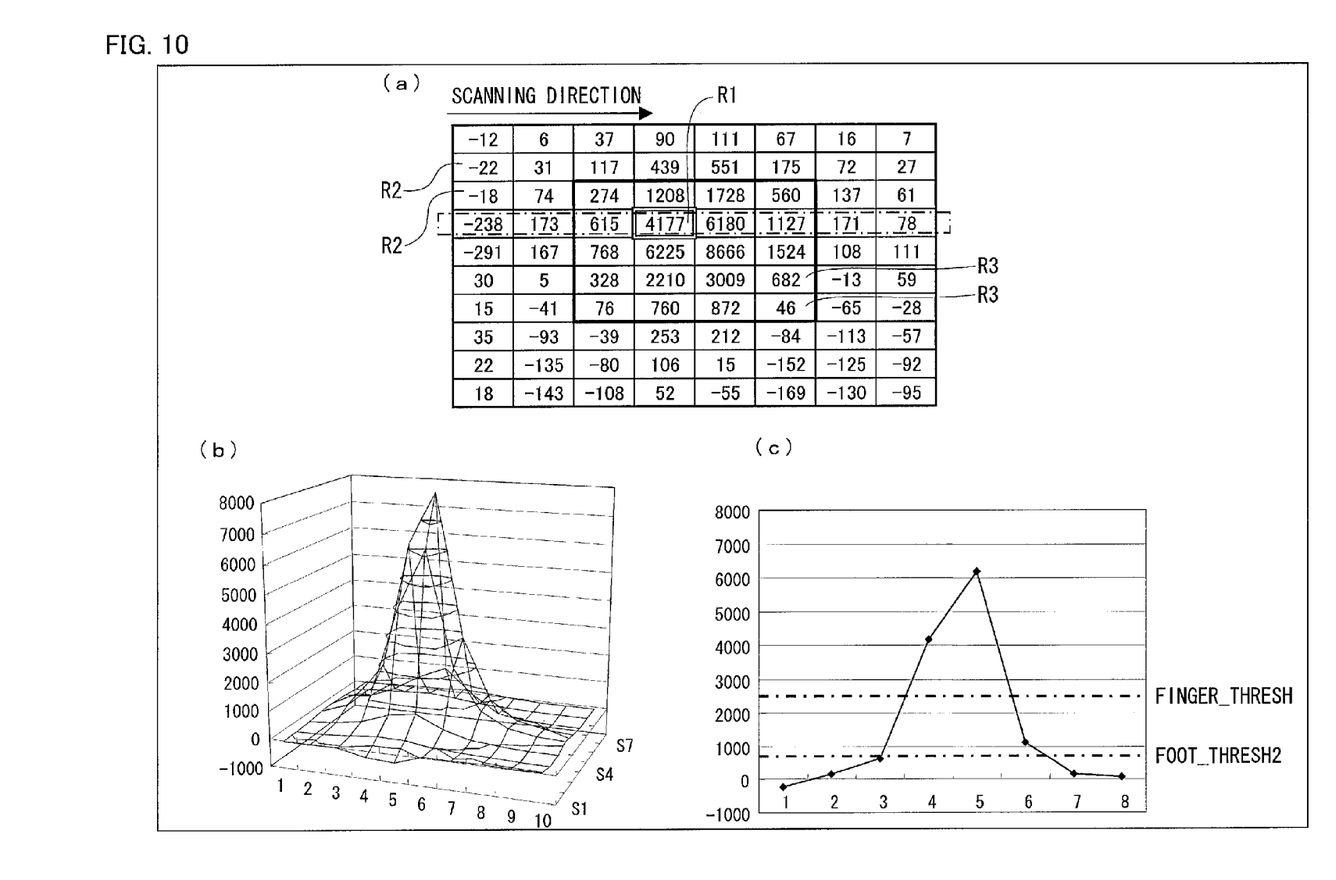

(a) of FIG. 10 is an example in which a part of the capacitance distribution map (an area around a finger touch position) is actually measured in a case where the touch panel is touched with a finger. This capacitance distribution map is generated by the capacitance distribution calculating section 3 shown in FIG. 1. The finger touch position is detected by carrying out sequential rightward scanning with respect to the capacitance distribution map from an upper left of the capacitance distribution map. A position at which the capacitance value exceeds the strength threshold FINGER_THRESH=2500 during the scanning is the detection region R1 indicated by an electrostatic capacitance signal value "4177" at an intersection of the fourth row and the fourth column. (a) of FIG. 10 corresponds to a case where the parameters shown in FIG. 6 are set as below assuming that coordinates corresponding to the detection region R1 are (i, j).

sm1=3
sp1=6
dm1=3
dp1=4
sm2=1
sp2=3
dm2=1
dp2=2

(b) of FIG. 10 is a three-dimensional graph of the capacitance distribution map of (a) of FIG. 10. (c) of FIG. 10 graphs electrostatic capacitance values of regions in the fourth row of the capacitance distribution map of (a) of FIG. 10. A region located outside a rectangular region with 5 rows and 4 columns which rectangular region is enclosed with a thick line and the detection region R1 and the intermediate regions R3 (see (a) of FIG. 10) serves as a region in which it is determined whether or not an electrostatic capacitance signal value is greater than the second peripheral threshold FOOT_THRESH2. For example, in a case where the second peripheral threshold is set to FOOT_THRESH2=700, there is no region outside the rectangular region in which region an electrostatic capacitance signal value exceeds the second peripheral threshold FOOT_THRESH2 (see (a) of FIG. 10). This causes the counter count to be 0. Therefore, for example, in a case where the area threshold is set to AREA_THRESH2=3, count>AREA_THRESH2 is not satisfied. Thus, the flag Flag[j][i] remains 1 and does not change. Therefore, it is determined that the detection region R1 at the coordinates (i, j) is a region in which the touch input is carried out by a finger but is not a hand placing region, so that C[j][i] is not zerofilled.

Figure 11:
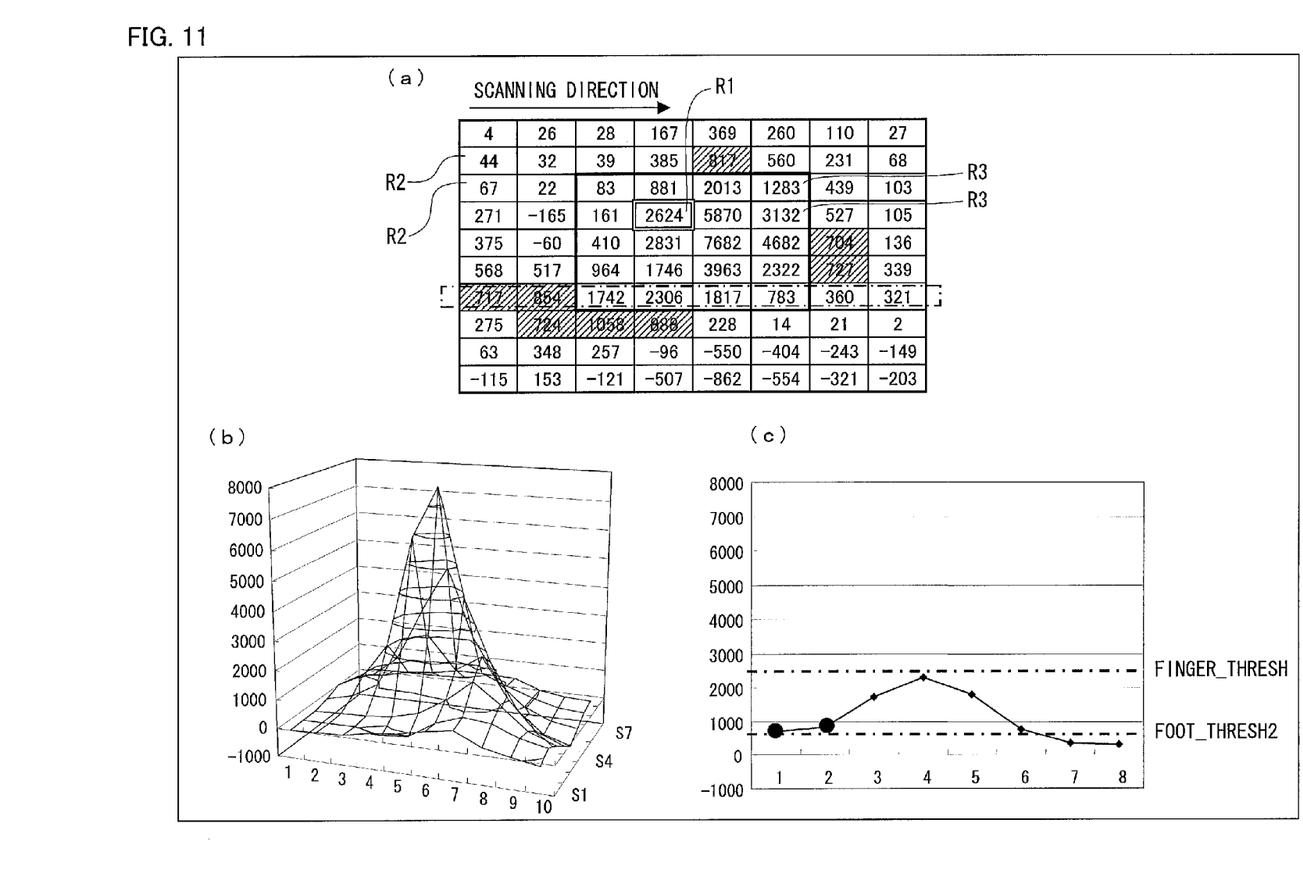

Similarly, (a), (b), and (c) of FIG. 11 are a capacitance distribution map obtained in a state in which a fist is in contact with the touch panel, and graphs of the capacitance distribution map. In a case where parameters s are set to values identical to those set as the parameters in the case of the finger input shown in FIG. 10, a region located outside a rectangle with 5 rows and 4 columns which rectangle includes the detection region R1 and the intermediate regions R3 and is enclosed with a thick line (see (a) of FIG. 11) serves as a region in which it is determined whether or not an electrostatic capacitance signal value is greater than the second peripheral threshold FOOT_THRESH2. There are 8 peripheral regions R2 each of which has an electrostatic capacitance signal value exceeding the second peripheral threshold FOOT_TRESH2=700 (see (a) of FIG. 11). This causes the counter count to be 8. In this case, if the second area threshold is set to AREA_THRESH2=3, count>AREA_THRESH2 is satisfied. Thus, the flag Flag[j][i] is changed to 0. Therefore, it is determined that the detection region R1 at the coordinates (i, j) is not a region in which the touch input is carried out by a finger but is a hand placing region, so that C[j][i] is zerofilled.

(Scope of Application)

The present embodiment gives an example of an electrostatic capacitance touch sensor system. However, the present invention is not limited to this. The present invention is also applicable to a touch sensor system other than the electrostatic capacitance touch sensor system. For example, the present invention is also applicable to an electromagnetic induction touch sensor system.

(Another Expression of the Present Invention)

The touch sensor system of the present invention is preferably configured such that in a case where (i) the strength of the electrostatic capacitance signal in the detection region exceeds the strength threshold and (ii) the number of peripheral regions in each of which a strength of an electrostatic capacitance signal exceeds the peripheral threshold exceeds a predetermined area threshold, the detecting means determines that the detection region is the hand placing region.

With the configuration, a simple algorithm makes it possible to determine the spread of the electrostatic capacitance distribution in the area around the detection region.

The touch sensor system of the present invention is preferably configured such that an intermediate region is provided between the detection region and the plurality of peripheral regions.

With the configuration, it is possible to efficiently determine the spread of the electrostatic capacitance in the area around the detection region.

The touch sensor system of the present invention is preferably configured such that the detecting means detects the hand placing region in accordance with a pen input threshold for determining whether or not the touch input is carried out by a pen.

With the configuration, it is possible to prevent a fear of falsely recognizing, as a hand placing region, a detection region in which an electrostatic capacitance signal in accordance with a pen input is generated.

The present invention is not limited to the description of embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a touch sensor system for detecting a pen input and a finger input to a touch panel including a plurality of electrostatic capacitances provided in a matrix pattern.

REFERENCE SIGNS LIST

1 Touch sensor system
2 Hand placing removing process section
3 Capacitance distribution calculating section
4 Touch recognizing section (Pen input recognizing means)
5 Detecting section (Detecting means)
6 Replacing section (Replacing means)
7 Touch panel
8 Hand placing parameter storage section
9 Driver
10 Sense amplifier
11 Timing generator
12 AD converter
13 Host device
14 Pen
15 Hand
18 Electrostatic capacitance value distribution detecting circuit
R1 Detection region
R2 Peripheral region
R3 Intermediate region

The invention claimed is:

1. A touch sensor system comprising:

detecting means for detecting, in accordance with an electrostatic capacitance signal indicative of a change in electrostatic capacitance, a hand placing region indicative of a region in which a hand is placed so as to carry out a touch input with respect to a touch panel which includes a plurality of electrostatic capacitances provided in a matrix pattern;

replacing means for replacing, by a non-value indicative of a state in which no touch input is carried out, a value of an electrostatic capacitance signal which value corresponds to an electrostatic capacitance provided in the hand placing region detected by the detecting means; and touch input recognizing means for supplying a coordinate value of the touch input to a host device in accordance with (i) the electrostatic capacitance signal whose value has been replaced by the non-value by the replacing means and (ii) an electrostatic capacitance signal corresponding to an electrostatic capacitance provided outside the hand placing region, the detecting means detecting the hand placing region in accordance with (i) a strength threshold for determining a strength of an electrostatic capacitance signal in a detection region so as to determine whether or not the touch input is carried out by a finger and (ii) a peripheral threshold which is lower than the strength threshold and is set so as to determine strengths of electrostatic capacitance signals in a plurality of peripheral regions surrounding the detection region.

2. The touch sensor system as set forth in claim 1, wherein, in a case where (i) the strength of the electrostatic capacitance signal in the detection region exceeds the strength threshold and (ii) the number of peripheral regions in each of which a strength of an electrostatic capacitance signal exceeds the peripheral threshold exceeds a predetermined area threshold, the detecting means determines that the detection region is the hand placing region.

3. The touch sensor system as set forth in claim 1, wherein an intermediate region is provided between the detection region and the plurality of peripheral regions.

4. The touch sensor system as set forth in claim 1, wherein the detecting means detects the hand placing region in accordance with a pen input threshold for determining whether or not the touch input is carried out by a pen.

* * * * *